United States Patent
Ahmadi

(10) Patent No.: US 10,200,997 B2
(45) Date of Patent: *Feb. 5, 2019

(54) METHODS AND APPARATUS FOR ENHANCED SCRAMBLING SEQUENCES

(71) Applicant: APPLE INC., Cupertino, CA (US)

(72) Inventor: Sassan Ahmadi, Cupertino, CA (US)

(73) Assignee: APPLE INC., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/356,154

(22) Filed: Nov. 18, 2016

(65) Prior Publication Data

US 2017/0071001 A1    Mar. 9, 2017

Related U.S. Application Data

(63) Continuation of application No. 13/754,673, filed on Jan. 30, 2013, now Pat. No. 9,503,914.

(Continued)

(51) Int. Cl.
*H04W 72/00* (2009.01)
*H04W 72/04* (2009.01)
(Continued)

(52) U.S. Cl.
CPC ...... *H04W 72/0466* (2013.01); *H04B 7/0632* (2013.01); *H04J 11/0053* (2013.01);
(Continued)

(58) Field of Classification Search
CPC ............ H04W 72/0466; H04W 24/02; H04W 72/0426; H04W 84/045; H04W 48/12; H04B 7/0632; H04J 11/0053; H04J 13/18
See application file for complete search history.

(56) References Cited

U.S. PATENT DOCUMENTS 8,526,555 B2    9/2013  Nagata et al.
8,570,971 B2   10/2013  Bhattad et al.
(Continued)

FOREIGN PATENT DOCUMENTS

JP   2008-533928   8/2008
JP   2010-45546    2/2010
(Continued)

OTHER PUBLICATIONS

Samsung, DMRS Scrambling for Downlink CoMP [online], 3GPP TSG RAN WG1 #67 R1-114226, Internet<URL:http://www.3gpp.org/ftp/tsg_ran/WG1_RL1/TSGR1_67/Docs/R1-114226.zip>, Nov. 8, 2011.

(Continued)

*Primary Examiner* — Stephen M D Agosta
(74) *Attorney, Agent, or Firm* — Fay Kaplun & Marcin, LLP

(57) ABSTRACT

Methods and apparatus for identification of macro-cells and subordinate transmission nodes. In one embodiment, the methods and apparatus are configured for use within a long term evolution (LTE/LTE-A) network, and include a scrambling technique which can facilitate advanced capabilities in which the subordinate nodes possess unique cell identities from the macro-cell. The use of unique scrambling sequences allows subordinate node switching and other advanced multi-antenna techniques in heterogeneous networks. The disclosed methods and apparatus further allow for distinction and detection of signals transmitted from low-power RRHs, femto-cells, etc. and advantageously achieve greater interference randomization gain.

20 Claims, 8 Drawing Sheets

Related U.S. Application Data

(60) Provisional application No. 61/593,208, filed on Jan. 31, 2012.

(51) Int. Cl.
| | |
|---|---|
| *H04W 24/02* | (2009.01) |
| *H04W 84/04* | (2009.01) |
| *H04J 11/00* | (2006.01) |
| *H04J 13/18* | (2011.01) |
| *H04B 7/06* | (2006.01) |
| *H04W 48/12* | (2009.01) |

(52) U.S. Cl.
CPC ............. *H04J 13/18* (2013.01); *H04W 24/02* (2013.01); *H04W 72/0426* (2013.01); *H04W 84/045* (2013.01); *H04W 48/12* (2013.01); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/146* (2018.01)

(56) References Cited

U.S. PATENT DOCUMENTS

| | | | |
|---|---|---|---|
| 8,654,696 | B2 | 2/2014 | Fukuoka et al. |
| 8,824,533 | B2 | 9/2014 | Chmiel et al. |
| 9,143,305 | B2 | 9/2015 | Gorokhov et al. |
| 9,949,239 | B2 | 4/2018 | Parkvall et al. |
| 2009/0238086 | A1* | 9/2009 | Ringstrom ........... H04B 7/0417 370/252 |
| 2009/0296635 | A1 | 12/2009 | Hui et al. |
| 2010/0210273 | A1* | 8/2010 | Jun ........................ H04W 24/02 455/450 |
| 2012/0069825 | A1* | 3/2012 | Ode ........................ H04B 7/024 370/336 |
| 2012/0236741 | A1* | 9/2012 | Xu ......................... H04B 7/024 370/252 |

FOREIGN PATENT DOCUMENTS

| | | |
|---|---|---|
| JP | 2010-536236 | 11/2010 |
| JP | 2011-525738 | 9/2011 |
| JP | 2011-259194 | 12/2011 |
| JP | 2014-513506 | 5/2014 |
| WO | 2007/043477 | 4/2007 |

OTHER PUBLICATIONS

Huawei, HiSilicon, Enhancements of DL DMRS for CoMP [ online ], 3GPP TSG RAN WGI Meeting #67 R1-113641, Internet<URL:http://www.3gpp.org/ftp/tsg_ran/WGI_RL1/TSGR1_67/Docs/R1-1 13641.zip>, Nov. 8, 2011.

Vodafone Group, Airvana, AT&T, ip.access, Orange, picoChip Designs, Qualcomm Europe, Text Proposal for HNB TR25. 9xx: Guidance on HNB Self-Configuration [online], 3GPP TSG-RAN WG 4 (Radio) Meeting #48bis R4-082315, Internet <URL:http://www.3gpp.org/ftp/tsg_ran/WG4_Radio/TSGR4_48bis/Documents/R4-082315.zip>, Sep. 28, 2008.

Samsung, Interference Measurement for Downlink CoMP [online], 3GPP TSG RAN WGI #67 R1-114228, Internet<URL:http://www.3gpp.org/ftp/tsg_ran/WGI_ RL1/TSGR1_67 /Docs/R1-114228.zip>, Nov. 8, 2011.

Apple Inc., Scrambling Sequences for Enhanced PDCCH[online], 3GPP TSG RAN WGI Meeting #68 R1-120272, Internet<URL:http://www.3gpp.org/ftp/tsg_ran/WG1 _RL1/TSGR1_68/Docs/R1-120272.zip>, Feb. 1, 2012.

\* cited by examiner

METHODS AND APPARATUS FOR ENHANCED SCRAMBLING SEQUENCES

PRIORITY AND RELATED APPLICATIONS

This application claims priority to U.S. Provisional Patent Application Ser. No. 61/593,208 filed Jan. 31, 2012 and entitled "METHODS AND APPARATUS FOR ENHANCED SCRAMBLING SEQUENCES", the foregoing being incorporated herein by reference in its entirety.

This application is also related to co-owned, co-pending U.S. patent application Ser. No. 13/754,673 filed contemporaneously herewith on Jan. 30, 2013, and entitled "METHODS AND APPARATUS FOR EFFICIENT SPECTRAL USAGE IN EXTENSIBLE CARRIER DEPLOYMENTS", which claims priority to U.S. Provisional Application Ser. No. 61/593,218 filed on Jan. 31, 2012, and entitled "METHODS AND APPARATUS FOR EFFICIENT SPECTRAL USAGE IN EXTENSIBLE CARRIER DEPLOYMENTS", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The present disclosure relates generally to the field of telecommunications and data networks. More particularly, in one exemplary aspect, the present disclosure is directed to the intelligent management of subordinate nodes in a wireless network.

2. Description of Related Technology

3GPP Long Term Evolution (LIE) is a wireless data communications technology that increases the capacity and speed of cellular data networks by using advanced wireless communications modulation techniques. While the high data rates seen in LTE are relatively easy to maintain when close to an evolved Node B (eNB), low signal strength as a result of increased distances from an eNB, as well as interference from neighboring eNBs, can detrimentally affect LTE communication data rates. Network providers have begun addressing these issues through the deployment of heterogeneous networks, in which smaller communications subordinate nodes are deployed throughout a larger node (i.e., a macro-cell). FIG. 1 shows a heterogeneous network 100 that consists of macro-cells consisting of respective eNBs 102 that are further divided into smaller sub-cells consisting of subordinate transmission/reception nodes 104 (e.g., pico-cells, femtocells, or distributed antenna systems using remote radio heads). These sub-cells may or may not share the same cell identity with the macro-cell. From the perspective of the network, only the macro-cell (or alternatively a cell with a unique physical layer identifier) can be recognized and interfaced with. Accordingly, if the subordinate nodes (e.g., remote radio heads) share the same cell identifier with the macro-cell, then the subordinate nodes are transparent to the network (i.e., the network cannot individually interface with the subordinate nodes). As illustrated in the system 200 of FIG. 2, the in-bound information to those subordinate nodes 206 will be distributed through the eNB 204, and the out-bound information from those nodes 206 will be collected and sent to the network 202 by the eNB 204.

In implementations in which each subordinate node and its respective macro-cell each possess a unique physical layer identity (from the perspective of the network), the network would be required to recognize and transmit and/or receive information from each node separately. For example, within the context of LTE, the network would need separate S1-U interfaces (i.e., the network interface between the eNB and the serving gateway (GW)) and S1-MME interfaces (i.e., the network interface between the eNB and the mobility management entity (MME)) for each node and subordinate node, as well as separate X2 interfaces (i.e., the network interface between eNBs) between each of the nodes. In addition to the large amount of communication overhead required for such an implementation, the network also must coordinate the operation of eNBs with subordinate nodes, where each subordinate node may be unpredictably turned on and off.

Consequently, the sharing of the same cell identifier by neighboring nodes undesirably increases intra-cell interference, and degrades the channel estimation performance and coherent detection of data and control channels. The sharing of the same physical layer cell identity also limits the use of certain technologies, such as e.g., advanced closed-loop single user multiple input multiple output, multiple user multiple input multiple output (SU-MIMO/MU-MIMO) beamforming techniques. Furthermore, the use of the same physical layer cell identity by subordinate nodes prevents subordinate node identification and switching.

Accordingly, improved apparatus and methods are needed to improve upon the handling of subordinate nodes within a given macro-cell. Such improved apparatus and methods would ideally be transparent from the perspective of core network management and control.

SUMMARY

The present disclosure satisfies the aforementioned needs by providing improved apparatus and methods for the deployment of scrambling data/control bit sequences over a communications network.

A macro-cell apparatus configured to operate within a wireless network and configured to couple to at least one subordinate transmission node is disclosed. In one embodiment the macro-cell apparatus includes: a wireless transceiver configured to transmit and receive wireless signals; a processor; and a non-transitory computer-readable medium including one or more computer program instructions. In one such variant, the one or more computer program instructions are configured to, when executed by the processor, cause the macro-cell apparatus to: transmit one or more first scrambled reference signals, the one or more first scrambled reference signals scrambled with a first specific scrambling sequence that corresponds to the macro-cell; and assign at least one or more second scrambling sequences to the at least one subordinate transmission node, where the assignment of the at least one or more second scrambling sequences causes the at least one subordinate transmission node to scramble one or more transmissions with the assigned one or more second scrambling sequences.

In one variant, the at least one subordinate transmission node includes a base station, a femtocell, or a remote radio head (RRH).

In other variants, the one or more transmissions include one or more subordinate transmission node specific reference signals. In certain cases, the at least one subordinate transmission node is further configured to scramble at least one macro-cell specific reference signal with the first specific scrambling sequence.

In some variants, the one or more transmissions include one or more mobile device specific reference signals.

In still other implementations, the first specific scrambling sequence is selected from a set of scrambling sequences which are reserved for macro-cells. In certain cases, the at least one or more second scrambling sequences is selected from a set of scrambling sequences which are reserved for subordinate transmission nodes.

In still other variants, the macro-cell apparatus includes a peer-to-peer network interface configured to directly communicate with the at least one subordinate transmission node.

A subordinate transmission node apparatus configured to operate within a wireless network and to couple to a macro-cell is disclosed. In one embodiment, the subordinate transmission node apparatus includes: a wireless transceiver configured to transmit and receive wireless signals; a processor; and a non-transitory computer-readable medium including one or more computer program instructions. In one exemplary embodiment, the computer program instructions are configured to, when executed by the processor, cause the subordinate transmission node apparatus to, responsive to a received assignment for at least one or more second scrambling sequences from the macro-cell: transmit one or more first scrambled reference signals, the one or more first scrambled reference signals scrambled with a first specific scrambling sequence that corresponds to the macro-cell; and transmit one or more second scrambled reference signals, the one or more second scrambled reference signals scrambled with the received at least one or more second scrambling sequences.

In one variant, the assignment includes a first cell identity that differs from the cell identity of the macro-cell.

In other variants, the subordinate transmission node apparatus includes a base station, a femtocell, or a remote radio head (RRH).

In a third variant, the at least one or more second scrambling sequences is specific to the subordinate transmission node apparatus.

In a fourth variant, the first specific scrambling sequence is selected from a set of scrambling sequences which are reserved for macro-cells.

In a fifth variant, the at least one or more second scrambling sequences is specific to the target mobile device.

A mobile device configured to operate within a macro-cell of a wireless network, where the macro-cell includes at least one subordinate transmission node is disclosed. In one embodiment, the mobile device includes: a wireless transceiver configured to transmit and receive wireless signals; a processor; and a non-transitory computer-readable medium including one or more instructions. In one exemplary embodiment, the one or more instructions are configured to, when executed by the processor, cause the mobile device to: receive one or more first scrambled reference signals, the one or more first scrambled reference signals scrambled with a first specific scrambling sequence that corresponds to the macro-cell; descramble the received one or more first scrambled reference signal with the first specific scrambling sequence; receive one or more second scrambled reference signals, the one or more second scrambled reference signals scrambled with a second specific scrambling sequence that corresponds to the at least one subordinate transmission node; and descramble the received one or more second scrambled reference signals with the second specific scrambling sequence.

In one variant, the one or more first specific scrambling sequence is selected from a first set of scrambling sequences associated with macro-cells.

In other variants, the one or more second specific scrambling sequence is selected from a second set of scrambling sequences associated with subordinate transmission nodes. For instance, the one or more second specific scrambling sequence is assigned to the at least one subordinate transmission node by the macro-cell, and where the second specific scrambling sequence is selected from a second set of scrambling sequences associated with subordinate transmission nodes. Some implementations may further be characterized in that the first and second sets of scrambling sequences are distinct from one another. During operation, the one or more first scrambled reference signals and one or more second scrambled reference signals are transmitted with defined resource block elements.

Other features and advantages of the present disclosure will immediately be recognized by persons of ordinary skill in the art with reference to the attached drawings and detailed description of exemplary embodiments as given below.

Figure 1:
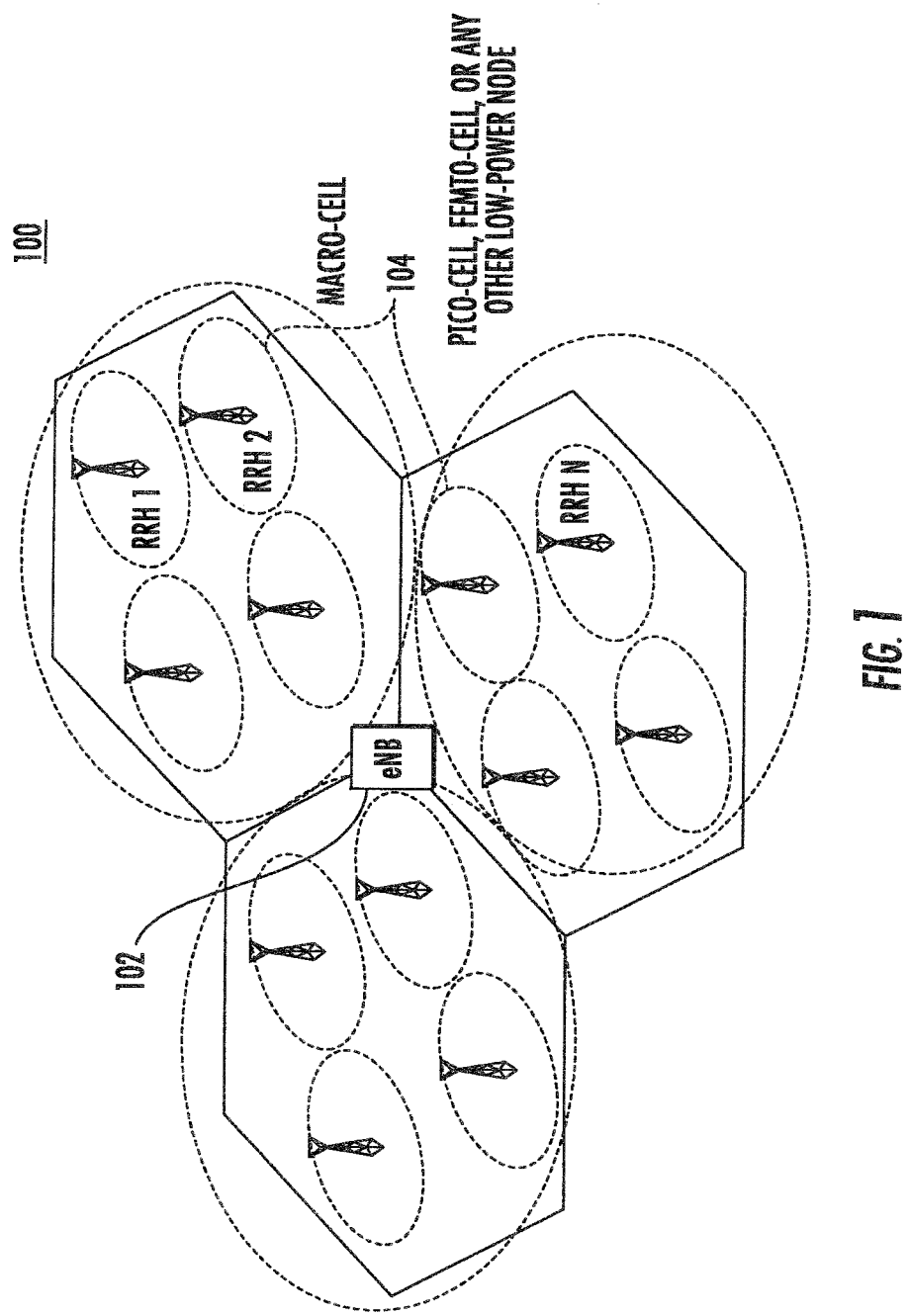
FIG. 1 is a functional block diagram illustrating one embodiment of a heterogeneous network.

All Figures® Copyright 2012-2013 Apple Inc. All rights reserved.

DETAILED DESCRIPTION

Reference is now made to the drawings, wherein like numerals refer to like parts throughout.

Overview

In one embodiment, a mechanism for identification of macro-cells and their subordinate transmission nodes is disclosed. In one variant, the mechanism is used with an LTE network, and includes a scrambling technique which can facilitate advanced capabilities (including e.g., Coordinated Multipoint (CoMP), Heterogeneous Networks (HetNet), antenna node switching, and other proposed LTE Release-11 techniques) in which each subordinate nodes possesses a unique cell identity from its respective macrocell. For reasons described in greater detail herein, distinct identification of macro-cells and their subordinate transmission notes allows for distinction and detection of signals transmitted from low-power RRHs, femto-cells, etc., and advantageously achieves more interference randomization gain.

Various disclosed methods are configurable and backward compatible (for instance, with earlier releases of LTE).

In exemplary embodiments, extant Release-8 LTE scrambling sequence generators are used to generate the transmission node-dependent sequences with different initialization values obtained from their corresponding sets. Such a scheme allows for the scanning and detection of transmission nodes (e.g., RRHs) in addition to macro-cells during cell selection/reselection process by both legacy devices (e.g., Release-8 compliant devices), and enhanced devices. In fact, for legacy devices the cell selection/reselection process advantageously remains unchanged. In certain exemplary LTE embodiments, the disclosed scheme is backward compatible, since the legacy scrambling method is used, and the two-level identification (described in greater detail herein) is only related to Rel-11 (and beyond) compatible network elements.

A two-level node/cell identification scheme is described, in which a set of transmission nodes are overlaid by a macro-cell. Node/cell identification information is not obtained from independent assignment of identities to transmission nodes and cells, rather the transmission/reception nodes scramble their corresponding reference signals, data, and control information with their provisioned/assigned scrambling sequence. Node/cell identification information is determined from the scrambling sequence. The use of unique scrambling sequences for each node/cell enables intelligent antenna node switching and other advanced multi-antenna techniques in heterogeneous networks. Additionally, the legacy Release-8/9/10 compliant reference signals (e.g., CRS, DM-RS, CSI-RS) as well as the same control signaling channels (e.g., PDCCH, PBCH) can also advantageously be reused.

Moreover, the disclosed apparatus and methods provide for improved channel estimation performance and coherent detection of data and control channels, while facilitating subordinate node identification (as well as switching between various subordinate nodes and/or the eNB of the macro-cell itself).

DETAILED DESCRIPTION OF EXEMPLARY EMBODIMENTS

Exemplary embodiments of the present disclosure are now described in detail. While these embodiments are primarily discussed in the context of Long Term Evolution (LTE) deployment scenarios related to Coordinated Multipoint (CoMP) and Heterogeneous Networks (HetNets), it will be recognized by those of ordinary skill that the present disclosure is not in any way limited to LTE applications. In fact, the various aspects of the disclosure are useful in any network in which a device needs to detect and distinguish a signal from multiple signals in order to improve, inter alia, subordinate node identification and switching.

Methods—

During normal operation, the typical exemplary user equipment (UE) needs to acquire initial system information to communicate with the network. Within the context of a two-level node/cell identification scheme, the UE must not only determine a unique identity assigned to each transmission/reception node (such that the transmission from and to this node can be distinguished from that of other nodes within acceptable error margin), but also identify the overlaid macro-cell which the transmission/reception node is associated with.

Figure 3:
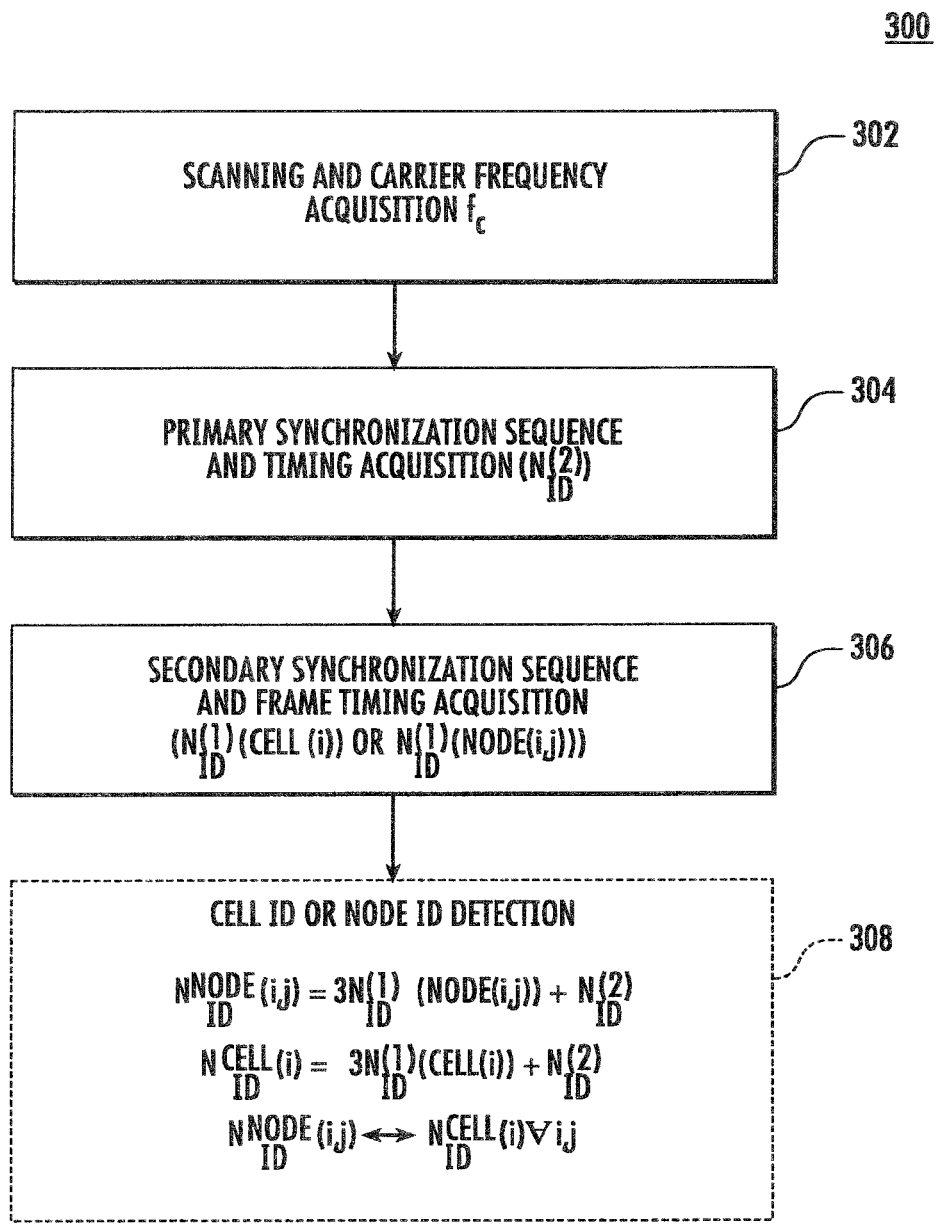
FIG. 3 is a logical flow diagram illustrating the process steps for the acquisition of a macro-cell identity or subordinate cell identity during cell selection/reselection in accordance with one embodiment of the present disclosure.

Referring now to FIG. 3, exemplary methodology 300 for acquiring initial system information is shown and described in detail. While the following discussion is presented within the context of a LTE-compliant cellular network, those of ordinary skill in the related arts will readily appreciate the applicability to other cellular technologies including, without limitation: Universal Mobile Telecommunications System (UMTS), Wideband Code Division Multiple Access (WCDMA), CDMA-2000 (and related technologies, CDMA 1×, CDMA EVDO), LTE-Advanced (LTE-A) also referred to herein as Release-11, etc. More generally, various principles described hereinafter may broadly apply to other wireless technologies including e.g., Wi-Fi, WiMAX, etc, with proper adaptation thereto, such adaptation being readily within the skill of the ordinary artisan given the present disclosure.

At step 302, the UE scans the network and performs carrier frequency acquisition for the carrier frequency ($f_c$). In one embodiment, the UE uses a carrier frequency recovery circuit in order to estimate and compensate for frequency and phase differences between the received signal's carrier wave and the receiver's local oscillator. These frequency and phase variations are in the exemplary embodiment estimated using information in the received signal in order to recover the carrier signal, and permit coherent demodulation of the carrier signal.

At step 304, the UE determines the primary synchronization sequence, and performs timing acquisition. For example, in the context of LTE, the UE first looks for the primary synchronization signal (PSS) which is transmitted in the last orthogonal frequency-division multiplexing (OFDM) symbol of the first time slot of the first subframe (i.e. subframe 0). This enables the UE to acquire the slot boundary independently from the chosen cyclic prefix selected for the cell. The PSS is repeated at a known interval and the UE uses the repeated PSS to achieve time synchronization with the transmitted signal (e.g., once the UE is aligned with the PSS, the UE can identify the frame/subframe/timeslot boundaries). Once the UE has properly decoded the PSS, the UE can determine the physical layer identity for the cell as well as the timing information for the determined cell.

At step 306, the UE determines the secondary synchronization sequence and obtains radio frame timing information. For LTE, the UE extracts the identifying information contained within the secondary synchronization signal (SSS). During acquisition of the secondary synchronization sequence, the UE can determine a unique physical layer cell identity for the transmitted signal. In one embodiment, there are one-hundred sixty eight (168) unique physical layer cell identity groups that are defined. These unique physical layer cell identity groups are divided between macro-cells and subordinate nodes (e.g. remote radio heads, femtocells, pica-cells, etc.), such that physical layer cell identity groups for a macro-cell will remain unique from the physical layer cell identity group of any given subordinate node within that respective macro-cell.

In this example, macro-cells and their subordinate nodes are uniquely identified and grouped according to distinct SSS. This distinct grouping can be used by an appropriately enabled UE to determine: (i) a first cell identity from the PSS (corresponding to the macro-cell), and (ii) a second physical layer cell identity group from the SSS (corresponding to the subordinate node).

In one variant, these unique physical layer cell identity groups are divided according to expected (or actual) deployed network architecture. For example, if a given macro-cell to subordinate node ratio can be expected (e.g., 1:3), the division of the unique physical layer cell identity groups among macro-cells and subordinate nodes can be divided similarly (i.e., 1:3). Alternatively, the division of physical layer cell identity groups can be divided up irregularly. For example, the allocation of physical layer cell identity groups can be distributed such that two or more subordinate nodes within a given macro-cell may share a common physical layer cell identity group so long as they are physically separated (i.e. geographically distinct) to prevent intra-cell interference among themselves. Those of ordinary skill will readily appreciate the myriad of possible schemes for dividing unique physical layer cell identity groups between macro-cells and subordinate nodes, given the contents of the present disclosure.

At step 308, the determination of the cells' identity enables the UE to identify one or more pseudo-random sequences used by the transmitter node to generate one or more cell-specific reference signals. For example, the UE can determine the initialization of the positioning reference signal (PRS) generator based on the cell's unique identity and the cyclic prefix (CP) that was used. Thereafter, the UE can fully synchronize with the radio cell. In some embodiments, this may include determining the physical layer cell identity for the macro-cell of a determined subordinate node. Once synchronized, the UE can extract the cell-specific reference signals, since the reference signals are transmitted in well-defined resource elements (i.e., the resource elements are transmitted according to a defined time and frequency).

These reference signals may be used to estimate the quality of the radio channel, and distinguish between, subordinate nodes and eNBs, given the unique nature of their respective physical layer cell identity groups. The UE calculates a channel quality indicator (CQI) that is reported to the eNB (directly, via a subordinate node, etc.), and the eNB can use this information in order to identify and select the best subordinate node or nodes for connectivity and switch between them as the UE travels throughout a given macro-cell. Accordingly, such a mechanism enables identification and switching among the macro-cell and its subordinate nodes based on, for example, the quality of the radio channel, while advantageously remaining transparent from the perspective of the core network (i.e., control is handled by the macro-cell).

Furthermore, because the unique identification of subordinate nodes can be handled transparently from the perspective of the core network (i.e., the subordinate node identification is handled by the macro-cell), the core network does not have to utilize its resources in managing subordinate nodes; rather, the subordinate nodes are managed by the eNBs themselves.

The use of different scrambling sequences initialized with unique cell identifiers can provide interference randomization, and helps the UE to separate data and control channels transmitted by different transmission nodes. Since the reference signals (e.g., CRS, DM-RS, CSI-RS) are scrambled with cell-specific sequences such that the UE can conduct various channel estimations and mobility measurements on different transmission nodes, the use of unique scrambling sequences can further improve operation, as well as node selection and switching in homogeneous and heterogeneous networks. More directly, the selection of scrambling sequences which are unique to one another ensures that the UE can identify each unique scrambling sequence.

Figure 4:
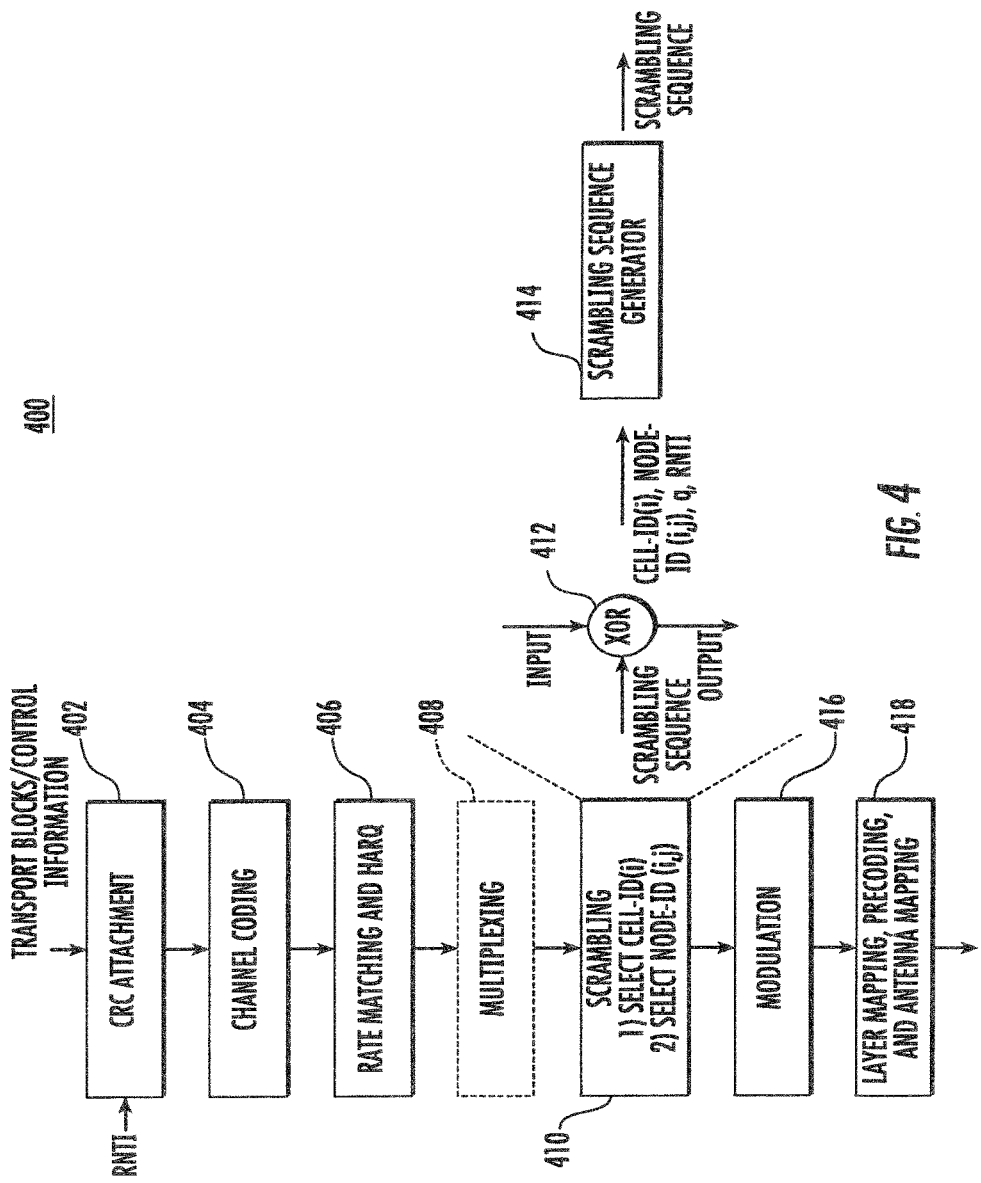
FIG. 4 is a logical flow diagram illustrating the physical processing of a typical transport channel and scrambling generator initialization in accordance with one embodiment of the present disclosure.

Referring now to FIG. 4, the physical processing methodology 400 of a typical transport channel in an LTE network is illustrated. At step 402, cyclic redundancy check (CRC) attachment is performed on incoming transport blocks and control information using RNTI as an input. CRC attachment provides error detection capability for the transport blocks.

At step 404, channel coding is performed on the incoming data. At step 406, rate matching and hybrid automatic repeat request (HARQ) is performed on the channel coded data so as to match the amount of data to be transmitted to the available capacity of different physical channels. Multiplexing occurs at step 408.

At step 410, the data/control bit sequences b(n) are scrambled by the node-specific identifier sequence (where the node-specific sequence is determined by the macro-cell for itself and its subordinate nodes) $d(n)=b(n) \oplus c_{node-ID_{ij}}(n)$ where $c_{node-ID_{ij}}(n) \Leftrightarrow c_{init}(i,j)$. In the receiver, the UE detects the transmission node identity through the cell selection or reselection process, as described previously with regards to FIG. 3. The input data goes through an XOR operation (at step 412) with the node-specific scrambling sequence, while at step 414, the scrambling sequence generator is used to generate the transmission node-dependent sequences with different initialization values obtained from their corresponding sets. Modulation occurs at step 416, while layer mapping, pre-coding, and antenna mapping occurs at step 418.

Example #1

Extant LTE scrambling sequence generators are initialized through the use of a unique cell identifier. For example, during physical downlink control channel (PDCCH) processing, the scrambling sequence generator is initialized with an initialization value in accordance with equation (1) at the start of each subframe.

$$c_{init}=[n_s/2]2^9+N_{ID}^{cell} \quad \text{(Eqn. 1)}$$

During subsequent processing of the physical downlink shared channel (PDSCH), the scrambling sequence generator is initialized at the start of each sub-frame with an initialization value in accordance with equation (2).

$$c_{init}=n_{RNTI} \cdot 2^{14}+q \cdot 2^{13}+[n_s/2] \cdot 2^{9+N_{ID}^{cell}} \quad \text{(Eqn. 2)}$$

The parameter $n_{RNTI}$ corresponds to the radio network temporary identifier (RNTI) associated with the PDSCH transmission and is UE specific (i.e., specific to the target device), while the parameter $q \in \{0,1\}$ denotes the codeword number where up to two codewords can be transmitted in one sub-frame. In the case of single codeword transmission, parameter q is equal to zero. The scrambling sequence c(n) is generated based on modulo-2 addition of two maximum-length sequences. The pseudo-random sequences are in the exemplary embodiment defined by a length-31 Gold sequence, where the output sequence c(n), ∀n=0 ... $M_{PN}-1$ is defined according to equations (3)-(6).

$$c(n)=(x_1(n+N_c)+x_2(n+N_c))\mod 2; \quad \text{(Eqn. 3)}$$

$$x_1(n+31)=(x_1(n+3)+x_1(n))\mod 2; \quad \text{(Eqn. 4)}$$

$$x_2(n+31)=(x_2(n+3)+x_2(n+2)+x_2(n+1)+x_2(n))\mod 2; \text{ and} \quad \text{(Eqn. 5)}$$

$$N_c=1600. \quad \text{(Eqn. 6)}$$

The first m-sequence is initialized with $x_1(0)=1$, $x_1(n)=0$, n=1, 2 ... 30. The initialization of the second m-sequence is denoted by equation (7) below with the value depending on the application of the sequence.

$$c_{init}=\Sigma_{i=0}^{30} x_2(i)2^i \quad \text{(Eqn. 7)}$$

An exemplary set of Gold code sequences consists of $2^n-1$ sequences, each one with a period of $2^n-1$, and can be generated based on two maximum-length sequences of the same length $2^n-1$ such that their absolute cross-correlation is less than or equal to $2^{(n+2)/2}$, where n is the size of the linear feedback shift register used to generate the maximum length sequence. The set of the $2^{n-1}$ XOR operations of the two sequences in their various phases is a set of Gold codes. The highest absolute cross-correlation in this set of codes is $2^{(n+2)/2}+1$ for even n and $2^{(n+1)/2}+1$ for odd n. The XOR of two Gold codes from the same set is another Gold code in some phase.

In the exemplary case of LTE Release-8, there are five-hundred and four (504) unique physical-layer cell identities. The physical-layer cell identities ($N_{ID}^{(1)}$) are grouped into one-hundred sixty eight (168) unique physical-layer cell-identity groups, each group containing three unique identities. The grouping is such that each physical-layer cell identity is part of one and only one physical-layer cell-identity group. A physical-layer cell identity is thus uniquely defined per equation (8) below where the number in the range of 0 to 167, represents the physical-layer cell-identity group, and the number is in the range of zero to two (0 to 2), and represents the physical-layer identity within the physical-layer cell-identity group. Accordingly, the physical-layer cell identity is defined below per equation (8).

$$N_{ID}^{cell}=3N_{ID}^{(1)}+N_{ID}^{(2)} \quad \text{(Eqn. 8)}$$

Figure 2:
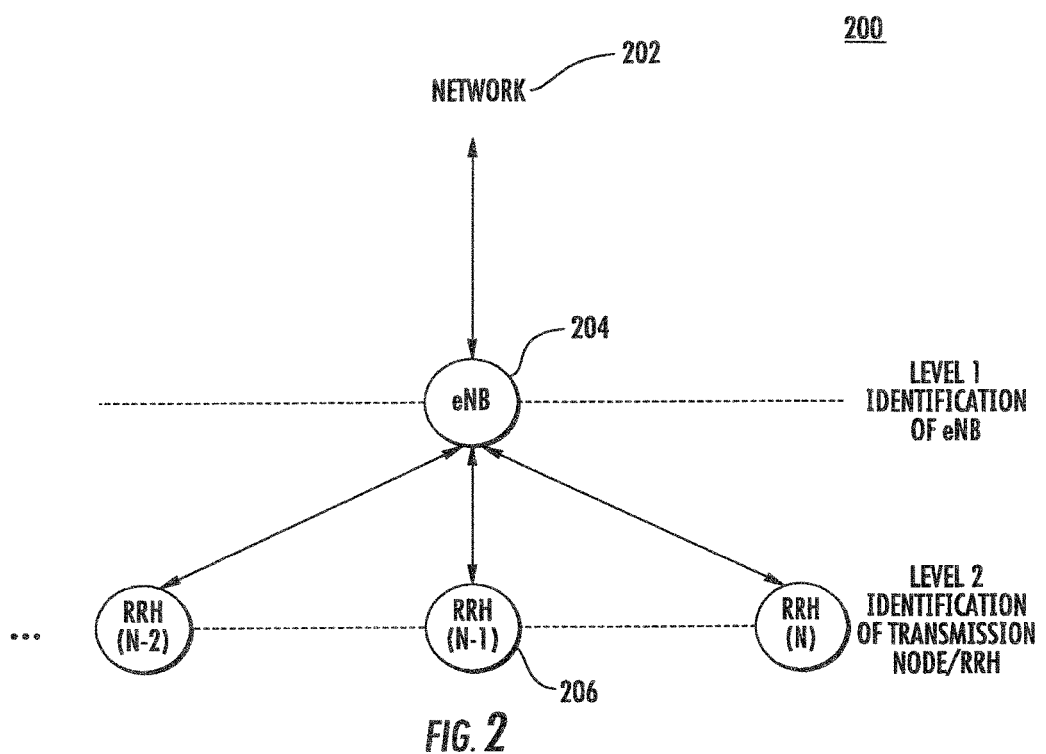
FIG. 2 is a functional block diagram illustrating two-level identification of macro-cells and their subordinate cells.

There is a one-to-one correspondence between the initialization value $N_{ID}^{cell}=x \leftrightarrow c_{init}(x)$ and the output sequence of the scrambling generating function c(n): that is $\leftrightarrow N_{ID}^{cell}=x \leftrightarrow c_x(n)$. In order to provide unambiguous identification of the transmission node, different scrambling sequences are assigned to each macro-cell and each subset of the macro-cell in the network (see, for example, FIG. 2). A two-level identification procedure is utilized where the first level will identify the eNB or the macro-cell and the second level will identify the subordinate cells of the macro-cell.

Let Ψ denote the set of all scrambling sequences. The set Ψ is divided into two subsets such that $\Psi=\Psi_1\cup\Psi_2$. The scrambling sequences associated with the macro-cells and those associated with the subordinate transmission nodes are denoted by $c_{Cell-ID}(n)$ and $c_{Node-ID}(n)$, respectively, where $c_{Cell-ID}(n)\in\Psi_1$, $c_{Node-ID}(n)\in\Psi_2$. The pseudo-random sequences $c_{Cell-ID}(n)$ and $c_{Node-ID}(t)$ are uncorrelated as long as the initialization seeds used to generate these sequences are different. Note that in the case of a homogeneous network ($\Psi_2=\emptyset$ and $\Psi=\Psi_1$), the network comprises only of macro-cells. Consequently, the pair $\{(N_{ID}^{cell}(i), N_{ID}^{node}(i,j)=|i=0, 1, ..., N_{cells}-1, j=0, 1, ..., N_{nodes}(i)\}$ will uniquely identify the jth node of the ith cell, where $N_{cells}$ denotes the number of macro-cell cell identities and $N_{nodes}(i)$ represents the number of transmission/reception nodes within the ith macro-cell.

Note that the cell and node identities can be reused in the neighboring cells, as long as they are sufficiently geographically far apart such that they cannot cause destructive interference for the UEs and the cell or node identities can be unambiguously detected. The assignment and management of these identities are left to the network operators.

In order to eliminate the need for separate acquisition of both macro-cell and subordinate node identities, the exemplary embodiment enables the use of existing cell identity acquisition procedures. In order to accomplish this, it is assumed that each set of $\Psi_2(i)=\{\Psi_2(i,j)|j=0, 1, ..., N_{node}(i)\}$ corresponds to the ith macro-cell. Therefore, when $N_{ID}^{cell}(i,j)$ is detected during cell selection/reselection procedure (shown at, for example, step 308 of the method of FIG. 3), it is known to the UE that this is the jth node of the ith macro-cell from which the cell and node identifiers are extractable. Accordingly, the initialization equation of the scrambling sequences for PDCCH and PDSCH (as an example) can be modified according to equations (9) and 10), respectively, to reflect the above concept.

$$c_{init}(i,j)=[n_s/2]2^9+N_{ID}^{cell}(i)+N_{ID}^{node}(i,j); \text{ and} \quad \text{(Eqn. 9)}$$

$$c_{init}(i,j)=n_{RNTI}2^{14}+q2^{13}+[n_s/2]2^9+N_{ID}^{cell}(i)+N_{ID}^{node}(i,j) \quad \text{(Eqn. 10)}$$

In the absence of subordinate nodes in a particular cell, there would be no contribution from the node identity in the derivation of the scrambling sequence initialization values in the above equations.

In order to relate the above algorithm to the existing scrambling sequence generation scheme, the set of one-hundred sixty eight (168) permissible values of is divided into two subsets where one group of values are exclusively used for macro-cells and another group of values are used exclusively for their corresponding subordinate nodes (if any). Thus $N_{ID}^{node}(i,j)=N_{ID}^{(1)}(node(i,j))+N_{ID}^{(2)}$, $N_{ID}^{cell}(i)=3 N_{ID}^{(1)}cell(i))+N_{ID}^{(2)}$ and $N_{ID}^{(2)}$ values are going to be used the same way for both the cell and node identity.

Simulation Results—

Figure 5A:
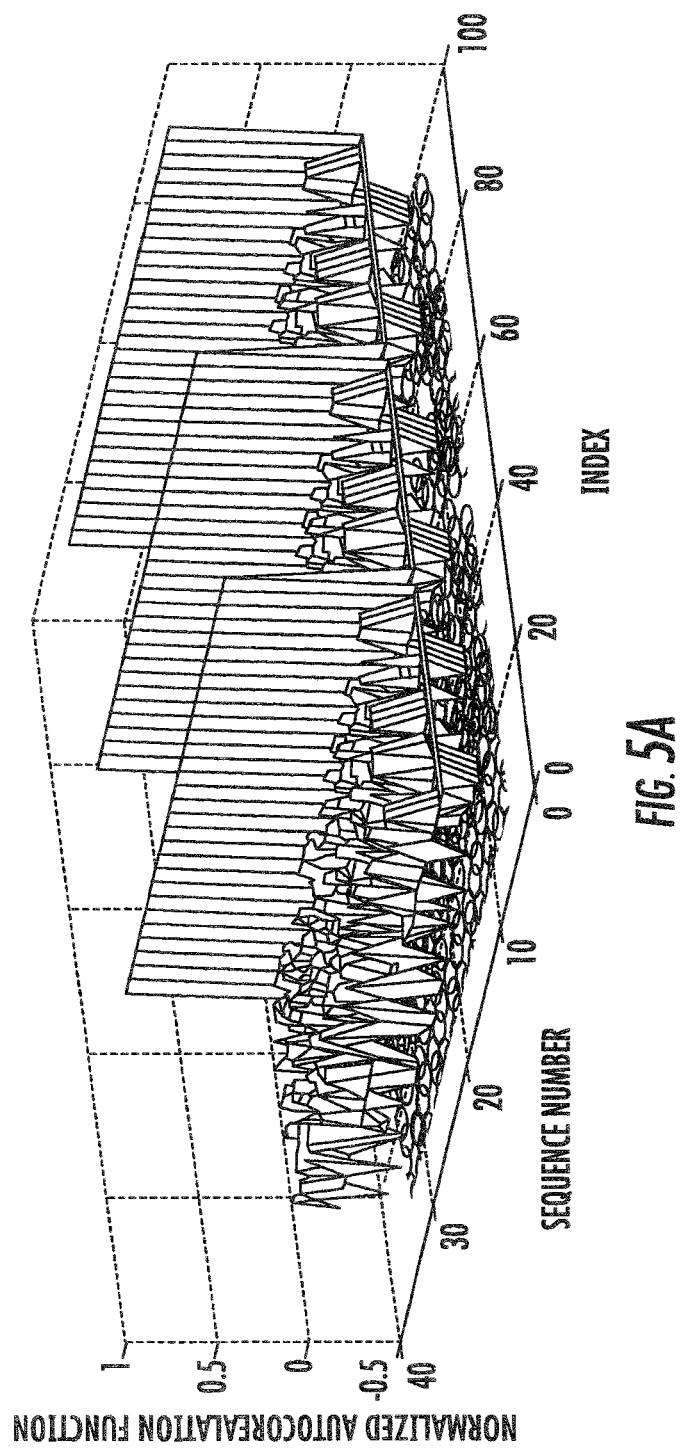
FIG. 5A is a simulation result illustrating normalized autocorrelation functions of length-31 scrambling Gold sequences generated with different initialization values in accordance with one embodiment of the present disclosure.
Figure 5B:
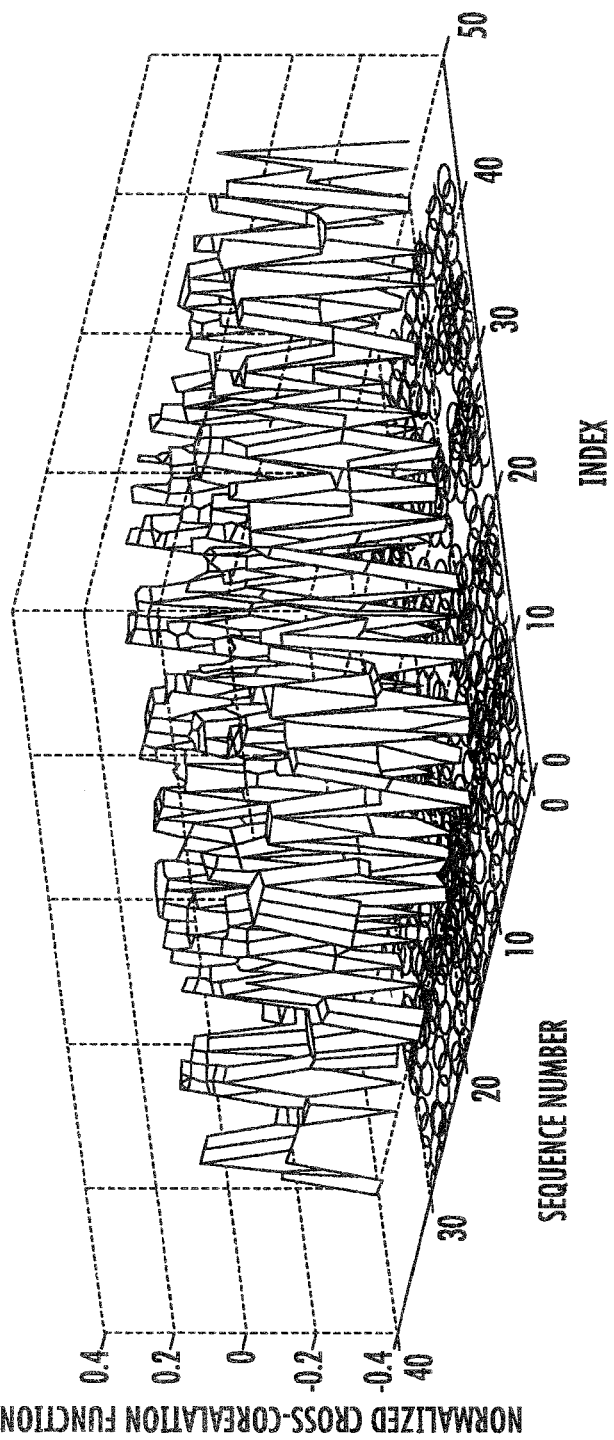
FIG. 5B is a simulation result illustrating normalized cross-correlation functions of length-31 scrambling Gold sequences generated with different initialization values in accordance with one embodiment of the present disclosure.

Referring now to FIGS. 5A and 5B, simulations performed by the Assignee hereof are illustrated, which demonstrate the intra-cell and inter-cell interference randomization properties of the scrambling sequences shown in equations (11) and (12) Below.

$$c_{Node-IDij}(n) \quad \text{(Eqn. 11)}$$

$$c_{Node-IDkl}(n)\forall k\neq i, j\neq l \quad \text{(Eqn. 12)}$$

The sequences in equations (11) and (12) are length-31 Gold sequences which are expected to have very small cross-correlation when generated based on two different initialization seeds. FIGS. 5A and 5B illustrate the normalized autocorrelation functions (ACF) and cross-correlation functions (CCF), respectively of two length-31 Gold sequences generated by two different initial values in order to demonstrate the required properties of the scrambling sequences.

Exemplary User Equipment (UE) Apparatus—

Figure 6:
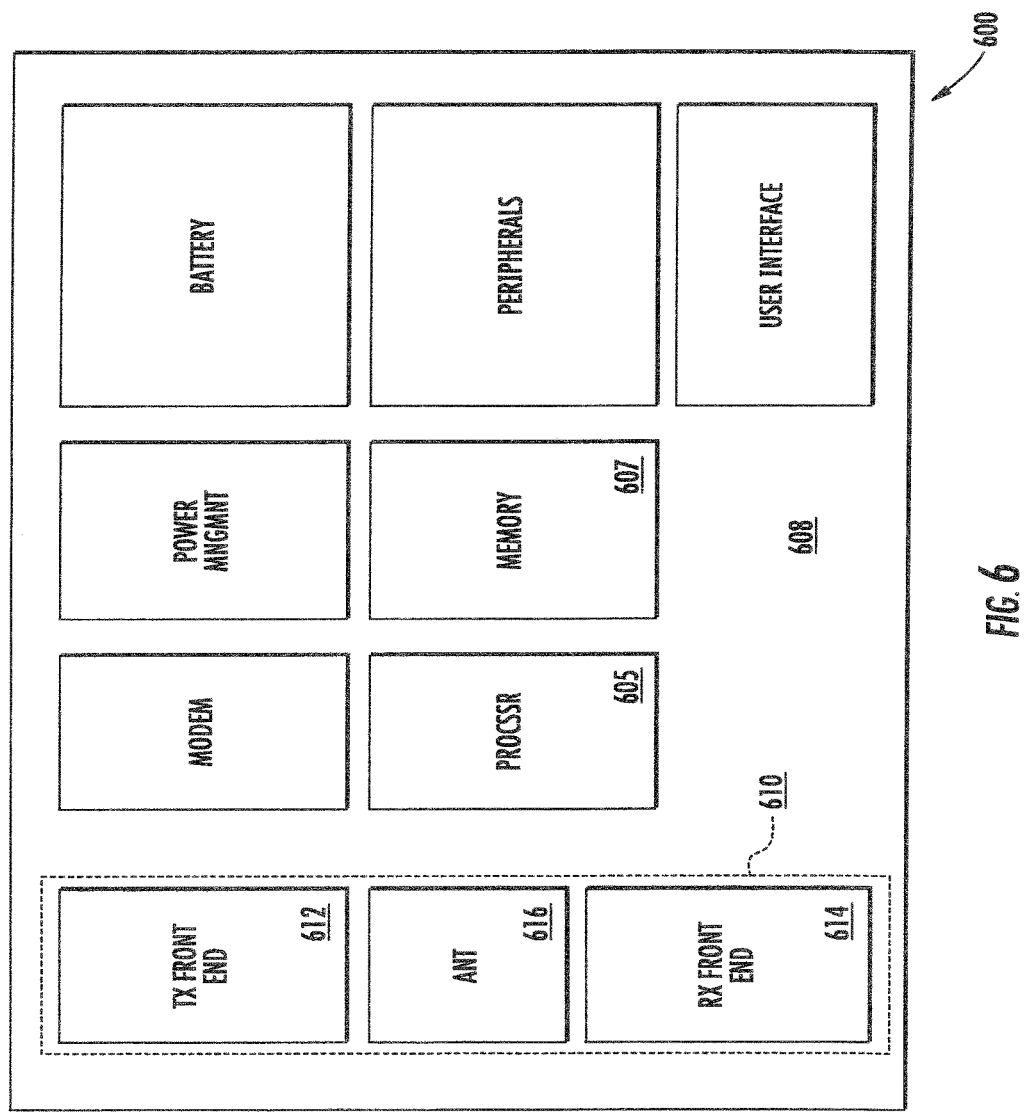
FIG. 6 is a functional block diagram illustrating one embodiment of a network component apparatus adapted to implement the methods of the present disclosure.

Referring now to FIG. 6, exemplary client or UE apparatus 600 useful in implementing the methods of the present disclosure is illustrated. As used herein, the terms "client" and "UE" include, but are not limited to cellular telephones, smartphones (such as for example an iPhone™), wireless enabled personal computers (PCs), and minicomputers, whether desktop, laptop, or otherwise, as well as mobile devices such as handheld computers, PDAs, personal media devices (PMDs), or any combinations of the foregoing. The acquisition of a physical layer identifier and subsequent initialization of a scrambling sequence generator is preferably performed in software, although firmware and hardware embodiments (and any combinations of the foregoing) are also envisioned; this apparatus is described subsequently herein with respect to FIG. 6.

The UE apparatus 600 comprises a processor subsystem 605 such as a digital signal processor, microprocessor, field-programmable gate array, or plurality of processing components mounted on one or more substrates 608. The processing subsystem may also comprise an internal cache memory. The processing subsystem 605 is connected to a memory subsystem 607 comprising memory which may for example, comprise SRAM, flash and SDRAM components. The memory subsystem may implement one or more of DMA type hardware, so as to facilitate data accesses as is well known in the art. In the illustrated embodiment, the processing subsystem additionally comprises subsystems or modules for implementing the scrambling sequence generators described previously herein. These subsystems may be implemented in software or hardware which is coupled to the processing subsystem. Alternatively, in another variant, the subsystems may be directly coupled to the digital baseband. The processor subsystem 605 is further coupled to wireless interface subsystem 610 that includes a transmission front end 612, receiving front end 614 and one or more antennas 616.

Common examples of scrambling sequence generators include, without limitation, linear feedback shift registers (LFSRs), programmable logic, look-up tables, software, etc. In one exemplary embodiment, the various scrambling sequence generators conform to equations 1-12, as described supra. Those or ordinary skill in the related arts may further modify and/or adapt the construction of the scrambling sequence generators consistent with other implementations, given the contents of the present disclosure.

As previously noted, during reception of one or more scrambled sequences, the embedded input data has been XOR'd with the node-specific scrambling sequence. As is well appreciated in the related arts, the XOR scrambling process can be unscrambled with a subsequent XOR with the same node-specific scrambling sequence. Accordingly, in order to extract the embedded input data, the received scrambled input data is XOR'd with the appropriate transmission node-dependent sequences and initialization values.

Exemplary Base Station (BS) Apparatus—

Figure 7:
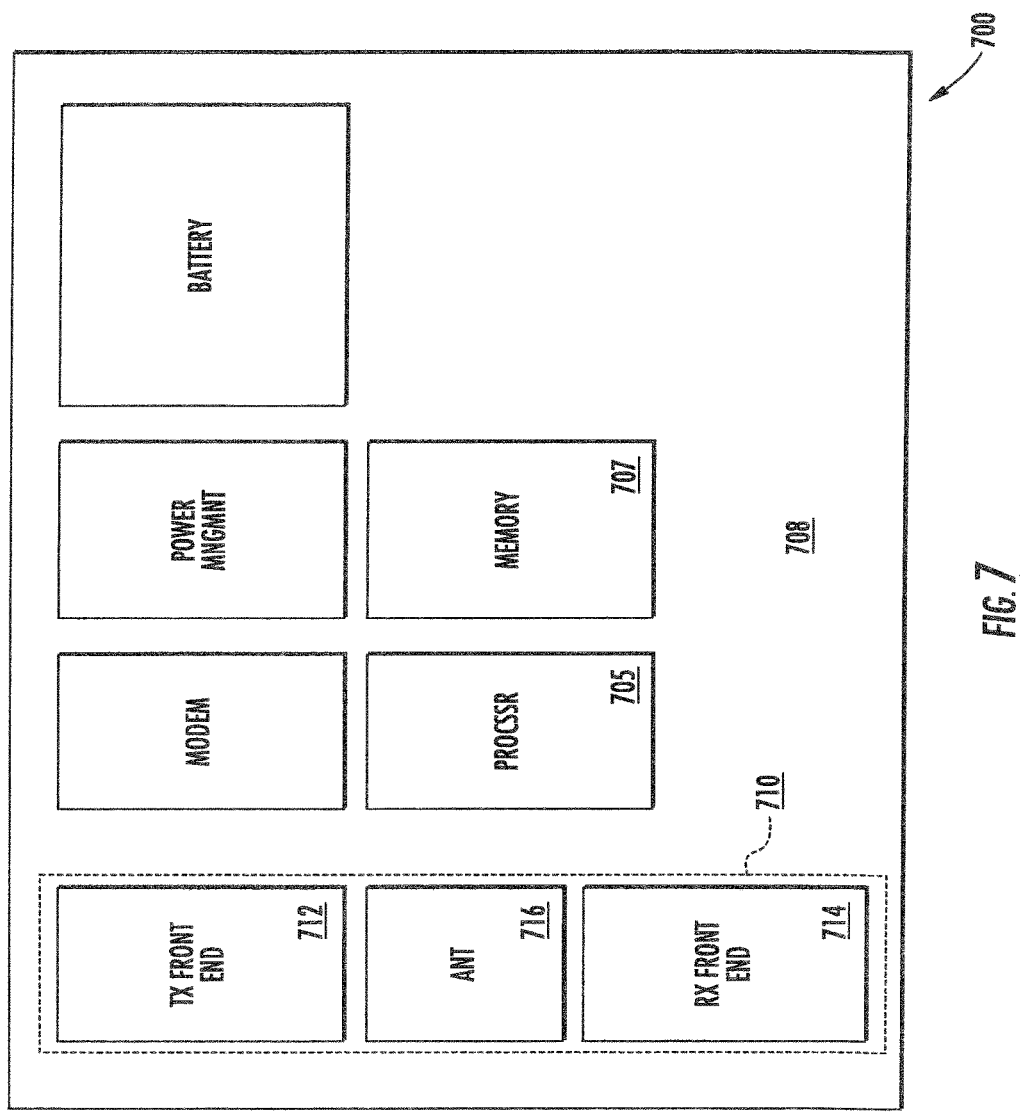
FIG. 7 is a functional block diagram illustrating one embodiment of a client or user device incorporating the enhanced subordinate cell identification functionality of the disclosure.

Referring now to FIG. 7, exemplary server or base station (BS) apparatus 700 useful in implementing the methods of the present disclosure is illustrated. As used herein, the terms "server" and "BS" include, but are not limited to base stations (e.g., NodeB, eNodeB, etc.), access points, relay stations, femtocells, etc. The configuration of physical layer identifiers is preferably performed in software, although firmware and hardware embodiments (and combinations thereof) are also envisioned; this apparatus is described subsequently herein with respect to FIG. 7.

The BS apparatus 700 comprises a processor subsystem 705 such as a digital signal processor, microprocessor, field-programmable gate array, or plurality of processing components mounted on one or more substrates 708. The processing subsystem may also comprise an internal cache memory. The processing subsystem 705 is connected to a memory subsystem 707 comprising memory which may for example, comprise SRAM, flash and SDRAM components. As with the user apparatus of FIG. 6, the memory subsystem 707 may implement one or a more of DMA type hardware, so as to facilitate data accesses as is well known in the art. In the illustrated embodiment, the processing subsystem additionally comprises subsystems or modules for implementing the physical layer identifier and associated scrambling sequence generators described previously herein. These subsystems may be implemented in software or hardware which is coupled to the processing subsystem. Alternatively, in another variant, the subsystems may be directly coupled to the digital baseband. The processor subsystem 705 is further coupled to wireless interface subsystem 710 that includes a transmission front end 712, receiving front end 714 and one or more antennas 716.

Common examples of scrambling sequence generators include, without limitation, linear feedback shift registers (LFSRs), programmable logic, look-up tables, software, etc. In one exemplary embodiment, the various scrambling sequence generators conform to equations 1-12, as described supra. Those or ordinary skill in the related arts may further modify and/or adapt the construction of the scrambling sequence generators consistent with other implementations, given the contents of the present disclosure.

During transmission of one or more scrambled sequences, the input data is XOR'd with the node-specific scrambling sequence.

Myriad other schemes for implementing the intelligent management of subordinate nodes in a wireless network will be recognized by those of ordinary skill given the present disclosure.

It will be recognized that while certain embodiments of the disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the principles disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the principles described herein. The foregoing description is of the best mode presently contemplated. This description is in no way meant to be limiting, but rather should be taken as illustrative of the general principles of the disclosure. The scope of the principles described herein should be determined with reference to the claims.

What is claimed is:

1. A processor comprising circuitry, wherein the processor is configured to:
    generate one or more first scrambled reference signals for transmission by a macro-cell that is configured to operate within a wireless network and configured to connect to at least one subordinate transmission node, the one or more first scrambled reference signals scrambled with a first cell-specific scrambling sequence that is unique to the macro-cell, wherein the one or more first cell-specific scrambling sequence is selected from a first set of cell-specific scrambling sequences associated with macro-cells; and
    assign at least one or more second scrambling sequences to the at least one subordinate transmission node, wherein the one or more second cell-specific scrambling sequence is selected from a second set of cell-specific scrambling sequences associated with subordinate transmission nodes, where the assignment of the at least one or more second scrambling sequences causes the at least one subordinate transmission node to scramble one or more transmissions with the assigned one or more second scrambling sequences, wherein identification information of the at least one subordinate transmission node is determined from the at least one or more second scrambling sequence, and wherein the one or more second cell-specific scrambling sequence is assigned to the at least one subordinate transmission node by the macro-cell.

2. The processor of claim 1, where the one or more transmissions comprise one or more subordinate transmission node specific reference signals.

3. The processor of claim 2, where the one or more transmissions further comprise at least one of subordinate transmission node specific data and control information.

4. The processor of claim 1, where the at least one subordinate transmission node is further configured to scramble at least one macro-cell specific reference signal with the first cell-specific scrambling sequence.

5. The processor of claim 1, where the first cell-specific scrambling sequence is selected from a set of cell-specific scrambling sequences which are reserved for macro-cells.

6. The processor of claim 5, where the at least one or more second scrambling sequence is selected from a set of scrambling sequences which are reserved for subordinate transmission nodes.

7. The processor of claim 1, wherein the identification information of the at least one transmission node indicates a physical layer cell identity for the macro-cell corresponding to the at least one transmission node.

8. The processor of claim 1, further configured to:
receive a channel quality indicator (CQI) corresponding to each at least one subordinate transmission node;
determine which at least one subordinate transmission node a user equipment should establish a connection with based on the CQI.

9. The processor of claim 1, wherein the first-cell specific scrambling sequence and the at least one or more second scrambling sequences are the same.

10. A processor comprising circuitry, wherein the processor is configured to:
receive at least one or more second scrambling sequences from a macro-cell;
generate one or more first scrambled reference signals for transmission by a subordinate transmission node that is configured to operate within a wireless network and connect to the macro-cell, the one or more first scrambled reference signals scrambled with a first cell-specific scrambling sequence that is unique to the macro-cell, wherein the one or more first cell-specific scrambling sequence is selected from a first set of cell-specific scrambling sequences associated with macro-cells; and
generate one or more second scrambled reference signals for transmission by the subordinate transmission node, the one or more second scrambled reference signals scrambled with the received at least one or more second scrambling sequences, wherein the one or more second cell-specific scrambling sequence is selected from a second set of cell-specific scrambling sequences associated with subordinate transmission nodes;

wherein identification information of the subordinate transmission node is determined from the at least one or more second scrambling sequence, and wherein the one or more second cell-specific scrambling sequence is assigned to the subordinate transmission node by the macro-cell.

11. The processor of claim 10, where the one or more transmissions comprise one or more subordinate transmission node specific reference signals.

12. The processor of claim 10, where the one or more transmissions further comprise at least one of subordinate transmission node specific data and control information.

13. The processor of claim 11, where the at least one subordinate transmission node is further configured to scramble at least one macro-cell specific reference signal with the first cell-specific scrambling sequence.

14. The processor of claim 10, where the first cell-specific scrambling sequence is selected from a set of cell-specific scrambling sequences which are reserved for macro-cells.

15. The processor of claim 10, where the at least one or more second scrambling sequence is selected from a set of scrambling sequences which are reserved for subordinate transmission nodes.

16. The processor of claim 10, wherein the identification information of the at least one transmission node indicates a physical layer cell identity for the macro-cell corresponding to the at least one transmission node.

17. The processor of claim 10, wherein the first-cell specific scrambling sequence and the at least one or more second scrambling sequences are the same.

18. A processor comprising circuitry, wherein the processor is configured to:
receive one or more first scrambled reference signals, the one or more first scrambled reference signals scrambled with a first cell-specific scrambling sequence that is unique to a macro-cell, wherein the one or more first cell-specific scrambling sequence is selected from a first set of cell-specific scrambling sequences associated with macro-cells;
descramble the received one or more first scrambled reference signal with the first cell-specific scrambling sequence;
receive one or more second scrambled reference signals, the one or more second scrambled reference signals scrambled with a second cell-specific scrambling sequence that corresponds to at least one subordinate transmission node, the one or more second cell-specific scrambling sequence is selected from a second set of cell-specific scrambling sequences associated with subordinate transmission nodes;

wherein identification information of the at least one subordinate transmission node is determined from the at least one or more second cell-specific scrambling sequence, and descramble the received one or more second scrambled reference signals with the second cell-specific scrambling sequence, wherein the one or more second cell-specific scrambling sequence is assigned to the at least one subordinate transmission node by the macro-cell.

19. The processor of claim 18, wherein the processor is further configured to a calculate a channel quality indicator (CQI) corresponding to each at least one subordinate transmission node.

20. The processor of claim 18, wherein the first-cell specific scrambling sequence and the at least one or more second scrambling sequences are the same.

* * * * *

UNITED STATES PATENT AND TRADEMARK OFFICE
CERTIFICATE OF CORRECTION

PATENT NO. : 10,200,997 B2  
APPLICATION NO. : 15/356154  
DATED : February 5, 2019  
INVENTOR(S) : Sassan Ahmadi Page 1 of 1

It is certified that error appears in the above-identified patent and that said Letters Patent is hereby corrected as shown below:

In the Claims

Column (14), Line (65) Claim (19):
"further configured to a calculate" should be "further configured to calculate"

Signed and Sealed this
Fourteenth Day of April, 2020

Andrei Iancu
*Director of the United States Patent and Trademark Office*